United States Patent Office 3,250,799
Patented May 10, 1966

3,250,799
PROCESS OF PREPARING 4-AMINO-4'-CHLORO-2-STILBENECARBONITRILE
David E. Graham and Eldred Welch, Westfield, N.J., assignors to General Aniline & Film Corporation, New York, N.Y., a corporation of Delaware
No Drawing. Filed June 7, 1963, Ser. No. 286,168
5 Claims. (Cl. 260—465)

This invention relates to a process of preparing 4-amino-4'-chloro-2-stilbenecarbonitrile in good yields and high purity by catalytic reduction of 4'-chloro-4-nitro-2-stilbenecarbonitrile in the presence of an aromatic solvent as an inert diluent.

It is well known in the art that 4-amino-4'-chloro-2-stilbenecarbonitrile is an intermediate useful in the manufacture of optical brighteners for textiles, detergents and other applications. Considerable difficulty has been experienced in the reduction of this particular nitro compound to its amine. The prior methods of iron and acid reduction required use of aqueous media in which the nitro compound is insoluble. In these methods it was necessary to use mutual solvents which were expensive and difficult to recover from the reaction mixture and the product.

Catalytic reduction with hydrogen of 4'-chloro-4-nitro-2-stilbenecarbonitrile overcame some of the disadvantages of the iron reduction method. However, it had the further disadvantage that side reactions occurred which produced undesirable byproducts to reduce the yield and quality of the desired amine. In the copending application of Welch, Serial Number 77,280 of December 21, 1960, which issued July 16, 1963, as U.S. Patent 3,098,092, these disadvantages of the catalytic process were overcome by the use of a solvent consisting of alkoxyethanols followed by isolation of the product by precipitation with water after an initial filtration to remove the hydrogenation catalyst. This process produced a high purity product in excellent yields but required the use of an expensive solvent. Furthermore, recovery of the solvent from the aqueous solution resulting from the isolation step was costly.

An object of this invention is to prepare 4-amino-4'-chloro-2-stilbenecarbonitrile in high purity and high yields. A further object is to attain the well known advantages of catalytic reduction over chemical reduction processes. An object is to provide an improved nickel catalyst for use in the preparation of this compound. Another object is to substitute low cost solvents for the more expensive alkoxyethanols used in the above mentioned copending application. A still further object is to utilize solvents which are readily recoverable from the reaction media.

The above objects of this invention were attained by our discovery of a process for preparing 4-amino-4'-chloro-2-stilbenecarbonitrile which comprises catalytic hydrogenation of 4'-chloro-4-nitro-2-stilbenecarbonitrile in aromatic solvents in the presence of a modified nickel on kieselguhr hydrogenation catalyst. The process disclosed in this invention may be carried out at temperatures from ambient to about 100° C. with the preferred temperatures being between 35° and 65° C. Generally, reduction may be effected by partial hydrogen pressures of from atmospheric to 100 p.s.i.g. It will be understood that lower or higher temperatures and pressures may be used. However, the moderate conditions of pressure and temperature disclosed above will be adequate for most purposes. Aromatic solvents boiling over the range of 80 to 180° C. may be employed in this invention. Aromatic solvents which have been found useful include benzene, toluene, xylenes, mixed alkylated benzenes or their mixtures.

Catalytic reduction of 4'-chloro-4-nitro-2-stilbenecarbonitrile to the amine may be accompanied by undesirable side reactions such as bimolecular reduction of the nitro to the corresponding azo or azoxy compound, reduction of the nitrile group to its amine or dechlorination. The choice of catalyst is critical in achieving the desired selectivity so that high yields of high purity 4-amino-4'-chloro-2-stilbenecarbonitrile are obtained. We have found that modified nickel on kieselguhr catalysts will give the desired selectivity whereas the usual nickel or precious metal catalysts give large amounts of byproducts. By selectivity we mean that only the desired reduction of the nitro group to the desired amine takes place without reduction of the nitrile, chloro or olefin groups in the molecule.

The nickel catalysts which we have found to be suitable for use in our process are finely divided nickel catalysts formed by reduction of a nickel compound on an inert carrier and which have been stabilized with respect to atmospheric air by selectively oxidizing the more active portions of the catalyst under controlled conditions so that from 30 to 50% of the nickel is converted to nickel oxide and the remaining 70 to 50% is present as free nickel. A preferred method of stabilizing these reduced metal catalysts by selective oxidation is described in the U.S. Patent 2,677,668 of Ahlberg. Such catalysts are known in the art but for the sake of completeness a convenient method for the preparation of these catalysts is briefly as follows. Basic nickel carbonates are precipitated on a suitable inert carrier (e.g. kieselguhr, pumice, silica gel, alumina etc.) by addition of sodium carbonates to a solution of nickel nitrate. The carrier with basic nickel carbonate precipitated thereon is filtered, washed free of soluble salts and dried by heating at a low temperature (e.g. 60 to 70° C.) and the partially dried product is then heated to an elevated temperature (e.g. about 650° F.) to decompose the carbonates and to form nickel oxide. It will be understood that other metal salts such as chromium salts may be used in conjunction with the nickel salts.

After completion of the roasting process the catalyst is treated with a reducing gas (e.g. hydrogen) at an elevated temperature to convert the nickel oxide to finely divided nickel. This reduction can conveniently be effected by charging the catalyst into a reduction furnace in which gases may be circulated through the catalyst while it is in the furnace. The furnace is purged with nitrogen to remove air and then hydrogen is circulated through the furnace to remove nitrogen. When the desired concentration of hydrogen is obtained in the furnace, reduction of the catalyst is carried out by heating to a temperature of 625° F. while circulating hydrogen through the catalyst until the desired amount of reduction is obtained. The amount of reduction in the catalyst is determined by measuring the quantity of water condensed from the circulating gas during reduction.

When reduction is complete, hydrogen in the reduction furnace is replaced with nitrogen. The reduced catalyst is then cooled to room temperature. The catalyst at this point is pyrophoric in nature (i.e., it will oxidize rapidly when exposed to atmospheric air and may ignite spontaneously on exposure to air) and while it is an active hydrogenation catalyst is unsuitable in this form for use in the process of the present invention. The catalyst is therefore stabilized with respect to atmospheric air and rendered suitable for use in the process of the present invention by selective oxidation of the active portions of the catalyst under carefully controlled conditions which prevent excessive localized heating of the catalyst that may damage or destroy its catalytic properties. Excessive localized heating of the catalyst is called "hot spotting."

This stabilization or controlled oxidation may be effected by introducing a small quantity of oxygen into an inert atmosphere in contact with the catalyst bed at about room temperature, and gradually increasing the oxygen concentration until the catalyst is stabilized toward atmospheric air. A preferred method of stabilizing the catalyst is disclosed in U.S. Patent 2,677,668 to Ahlberg and is briefly as follows. The nitrogen atmosphere in the reduction furnace is replaced by carbon dioxide. A small amount of oxygen usually about 0.1% by volume is introduced into the carbon dioxide atmosphere. This mixture of gases is then slowly circulated through the catalyst bed at room temperature until the more active portions of the catalyst are oxidized without excessive localized heating and the temperature of the catalyst bed remains substantially at room temperature. After the catalyst has been stabilized to an oxygen concentration of 0.1% in carbon dioxide at room temperature, the oxygen content of the gas mixture is then gradually increased to 3% by volume while the gas mixture is being slowly circulated through the catalyst. After the catalyst is stabilized to oxygen concentrations of 3% in carbon dioxide, it is heated to 90–95° F. Atmospheric air is then gradually introduced into the circulating gas mixture until all of the carbon dioxide in the furnace has been replaced by air at this temperature. Approximately six hours is required to replace the carbon dioxide with air. After the catalyst has been stabilized to air at this temperature, it may be stored, packaged or handled in air without the danger of localized overheating or spontaneous ignition, and is suitable for use in the process of this invention.

While the solubility of 4-amino-4'-chloro-2-stilbenecarbonitrile is lower in aromatic solvents than in the alkoxyethanols, described in the above mentioned copending application, Serial No. 77,280, now U.S. Patent 3,098,092, its lower solubility in aromatic solvents is more than offset by the lower cost and ease of recovery of these aromatic solvents. In recovering the aromatic solvents in the process disclosed by this invention it is not necessary to separate the water phase formed during reduction when these solvents are recycled. If desired or necessary, the aromatic solvents may be purified by very simple distillation before reuse. When alkoxyethanols are used as solvents, the product must be precipitated by addition of a large excess of water and separated from dilute solutions of alkoxyethanols in water by filtration. Recovery of alkoxyethanols from large volumes of their solutions creates serious processing and economic problems.

Separation of 4-amino-4'-chloro-2-stilbenecarbonitrile from the aromatic solvents used in this invention may be accomplished simply in the following manner. Catalyst is removed from the solution of the amine in aromatic solvent by filtration at temperatures of about 75 to 120° C. After catalyst is removed, the solution is cooled to 0–10° C. where the amine separates as a crystalline product which may be removed by filtration. The aromatic solvent may then be reused directly. Small amounts of impurities are formed each time the aromatic solvent is used in the process and remain in the solvent when it is reused. The concentration of these impurities in the solvent tends to increase each time the solvent is used. Until the concentration of these impurities in the solvent becomes sufficiently high to adversely affect purity of the product, their presence is not objectionable. When the concentration of these impurities in the solvent does become high enough to be objectionable, the solvent may be easily purified by simple distillation.

The following examples are illustrative of the present invention and are not to be regarded as limitative. It will be understood that all parts and proportions referred to herein and in the appended claims are by weight unless otherwise indicated.

*Example 1*

A solution of 126 g. of 4'-chloro-4-nitro-2-stilbenecarbonitrile in 750 cc. of toluene was charged to a stainless steel hydrogenation autoclave equipped with an agitator. After the autoclave was purged with nitrogen, 34 g. of a modified nickel on kieselguhr catalyst prepared by the method described in U.S. Patent 2,677,668 was added to the solution in the autoclave. This catalyst contained about 60% nickel of which about 40% of the nickel was in the form of nickel oxide and the remainder (about 60%) was present as free nickel. The autoclave was purged with hydrogen, heated to 55° C. and the charge in the autoclave was hydrogenated at 50 p.s.i.g. until the theoretical amount of hydrogen, 3 moles per mole of nitro compound, was consumed.

As soon as the hydrogenation was complete, the reaction mixture was heated to 100° C. and filtered to remove catalyst. The catalyst filter cake was washed with a small amount of hot toluene. In plant practice it would not be necessary to wash the filter cake as the catalyst would be used in the next production. This filtrate was then cooled to 0 to 5° C. where the amino compound separated as a crystalline product and was held at this temperature for 30 minutes. The product was removed from toluene by filtration, washed on the filter with 75 cc. of cold toluene and transferred from the filter to an oven where it was dried at 85° C. The yield obtained was almost quantitative. Purity of the product was determined by ultraviolet spectrophotometric analysis and found to be equivalent to 99.1% of a highly purified standard. The product had a melting point of 169.4–169.8° C. The toluene filtrate may be reused in a subsequent reduction.

*Example II*

A solution of 5 g. 4'-chloro-4-nitro-2-stilbenecarbonitrile in 100 cc. of toluene was charged into the autoclave described in Example I. The autoclave was purged with nitrogen and 0.75 g. of 5% palladium on carbon catalyst added. The reaction mixture was agitated and nitrogen in the autoclave was displaced with hydrogen. This mixture was reacted with hydrogen at 25° C. and atmospheric pressure until slightly more than 4 moles of hydrogen were reacted and reaction with hydrogen was complete.

Catalyst was removed by filtration at 25° C. The filtrate for concentrated to 30 cc. and cooled to 0 to 5° C. The reaction product was removed by filtration, washed with cold toluene and dried in an oven at 85° C. A product which melted over a wide range of temperature below that of the pure 4-amino-4'-chloro-2-stilbenecarbonitrile which melts at 170° C. was obtained. Its melting point (below 150° C.) indicated that the product was impure and of poorer quality than the product obtained in Example I. This crude product was obtained in less than 50% of the theoretical yield. This experiment demonstrated that palladium on carbon was not a suitable catalyst for use in reduction of the nitro compound to the amino compound even though more than the theoretical amount of hydrogen had been consumed in the reduction.

*Example III*

A solution containing 126 g. of the 4'-chloro-4-nitro-2-stilbenecarbonitrile in 750 cc. in toluene was charged to the autoclave described in Example I. After the autoclave was purged with nitrogen, 34 g. of a sponge nickel catalyst was charged to the solution. The catalyst was a skeletal nickel catalyst (Davison sponge nickel). The autoclave was purged with hydrogen and heated with agitation to 100° C. The reaction mixture was hydrogenated at 100 p.s.i.g. until no further reaction with hydrogen occurred. Approximately 3 moles of hydrogen per mole of 4'-chloro-4-nitro-2-stilbenecarbonitrile was consumed.

Catalyst was removed from the reaction mixture by filtration at 100° C. The filter cake was washed with a small quantity of hot toluene. This toluene solution was cooled to 0 to 5° C. and held at this temperature for 30 minutes. The product was removed by filtration and washed with 75 cc. of cold toluene. It was then dried at 85° C. in an oven and analyzed. The product melted over a range of 153–200° C. which indicated very poor quality. A small yield (under 20% of theory) was obtained. This experiment demonstrated the advantages of the modified nickel catalyst used in Example I over skeletal nickel catalyst.

*Example IV*

Example I was repeated with the exceptions that toluene was replaced by the same volume of benzene and a hydrogen pressure of 100 p.s.i.g. was used. A quantitative yield of 4-amino-4'-chloro-2-stilbenecarbonitrile was obtained. Analysis showed the product to have a melting point of 169.5–170.0° C. and a purity of 99.1%.

*Example V*

Example I was repeated with the exceptions that toluene was replaced by the same volume of mixed xylenes, and a reaction temperature of 40° C. was used. Analysis showed that a quantitative yield was obtained. The final product melted at 169.4–169.9° C. and had a purity of 99.0%.

*Example VI*

A modified nickel on kieselguhr catalyst was prepared by the method described in Adkins, Reactions of Hydrogen, University of Wisconsin Press, 1937, p. 19. This catalyst was substituted for the modified nickel catalyst in Example I using the same quantities of catalyst, toluene and 4'-chloro-4-nitro-2-stilbenecarbonitrile. No appreciable reaction with hydrogen was noted at a temperature of 60° C. and a pressure of 50 p.s.i.g. The temperature was increased to 100° C. without any appreciable hydrogen reaction at 50 p.s.i.g. Hydrogen pressure was then increased to 500 p.s.i.g. where hydrogenation occurred and about the theoretical amount of hydrogen reacted. The product was then separated by the procedure described in Example I. A low yield (under 30% of theory) of crude product which melted at the range of 148–200° C. was obtained. This experiment further demonstrated the advantages of the nickel catalyst described in Example I.

*Example VII*

Example I was repeated with the following exceptions: (1) a commercial mixed alkylated benzene solvent having boiling range of 160.5° C. to 174° C. was used in place of toluene, (2) the hydrogen pressure was 10 p.s.ig., and (3) the temperature was 65° C.

The reaction proceeded in substantially the same manner as in Example I to produce a high quality product in almost quantitative yield. The catalyst and solvent isolated from this reduction were reused in a second reduction under the same conditions without detriment to product yield or quality.

This invention has been disclosed with respect to certain preferred embodiments and various modifications and variations thereof will become obvious to persons skilled in the art. It is to be understood that such modifications and variations are to be included within the spirit and scope of this invention.

What is claimed is:

1. A process of preparing 4-amino-4'-chloro-2-stilbenecarbonitrile which comprises catalytic hydrogenation of 4'-chloro-4-nitro-2-stilbenecarbonitrile in an aromatic hydrocarbon solvent boiling from 80 to 180° C. in the presence of a finely divided nickel catalyst on inert carrier and stabilized with respect to atmospheric air and in which from 50 to 70% of the nickel is in the form of free nickel and the remaining 50 to 30% as nickel oxide.

2. A process as defined in claim 1 wherein the aromatic solvent is benzene.

3. A process as defined in claim 1 wherein the aromatic solvent is toluene.

4. A process as defined in claim 1 wherein the aromatic solvent is mixed xylenes.

5. A process as defined in claim 1 wherein the aromatic solvent is mixed alkylated benzenes boiling from 110 to 180° C.

References Cited by the Examiner

UNITED STATES PATENTS

| | | | |
|---|---|---|---|
| 2,458,214 | 1/1949 | Souders | 260—580 |
| 2,489,886 | 11/1949 | Houghton | 260—580 |
| 2,499,918 | 3/1950 | Houghton | 260—580 |
| 2,683,745 | 7/1954 | Emerson et al. | 260—580 XR |
| 2,784,220 | 3/1957 | Spiegler | 260—689 XR |

OTHER REFERENCES

Haddow: 4-Aminostilbene, 1949, pp. 184–192.

CHARLES B. PARKER, *Primary Examiner.*

DALE R. MAHANAND, *Assistant Examiner.*